United States Patent
Lebourgeois et al.

(10) Patent No.: US 6,436,307 B1
(45) Date of Patent: Aug. 20, 2002

(54) LOW LOSS FERRITES

(75) Inventors: Richard Lebourgeois, Gif s/Yvette; Jérôme Ageron, Chatou; Jean-Charles Bremaud, Nantes; Georges Peyresoubes, Cholet; Jean-Pierre Joulain, Trementines, all of (FR)

(73) Assignee: Thomson-CSF, Paris (FR)

( * ) Notice: Subject to any disclaimer, the term of this patent is extended or adjusted under 35 U.S.C. 154(b) by 0 days.

(21) Appl. No.: 09/597,413

(22) Filed: Jun. 19, 2000

(30) Foreign Application Priority Data

Jun. 29, 1999 (FR) .............................. 99 08319

(51) Int. Cl.[7] ................. C04B 35/30; C04B 35/34
(52) U.S. Cl. ................... 252/62.6; 252/62.62
(58) Field of Search .................. 236/233; 252/62.6, 252/62.62

(56) References Cited

U.S. PATENT DOCUMENTS

| | | | | |
|---|---|---|---|---|
| 3,032,503 A | * | 5/1962 | Sixtus et al. ............ | 252/62.6 |
| 5,748,013 A | | 5/1998 | Beauclair et al. .......... | 336/233 |
| 6,071,430 A | * | 6/2000 | Lebourgeois et al. ...... | 252/62.6 |
| 6,120,916 A | * | 9/2000 | Delvinquier et al. ........ | 428/692 |

FOREIGN PATENT DOCUMENTS

| | | |
|---|---|---|
| EP | 0 800 183 A1 | 10/1997 |
| JP | 8-133826 | 5/1996 |
| JP | 9-232124 | 9/1997 |

* cited by examiner

Primary Examiner—C. Melissa Koslow
(74) Attorney, Agent, or Firm—Oblon, Spivak, McClelland, Maier & Neustadt, P.C.

(57) ABSTRACT

A ferrite material based on nickel, copper and zinc has the following formula:

$$Ni_xZn_yCu_zCo_\epsilon Fe_{2\pm\delta}O_4$$

in which:

$x+y+z+\epsilon = 1 \pm \delta$ $\delta \leq 0.05$ $0.04 \leq \epsilon$ $0.05 \leq z \leq 0.35$ A material of this kind has the advantage of showing reduced losses.

9 Claims, 2 Drawing Sheets

MEASUREMENT TO 1,5 MHz

| TORUS SAMPLE REFERENCE | μs | DIELECTRIC LOSS FACTOR tg δ/μ |
|---|---|---|
| 511 | 107 | $17{,}1 \cdot 10^{-5}$ |
| 521 | 151 | $23 \cdot 10^{-5}$ |
| 523 | 186 | $3{,}6 \cdot 10^{-5}$ |
| 524 | 114 | $4{,}9 \cdot 10^{-5}$ |
| 525 | 114 | $4{,}9 \cdot 10^{-5}$ |
| 527 | 119 | $5{,}0 \cdot 10^{-5}$ |

| TORUS SAMPLE REFERENCE | μs | DIELECTRIC LOSS FACTOR tg δ/μ |
|---|---|---|
| 896 | 126 | $4{,}8 \cdot 10^{-5}$ |
| 897 | 128 | $6{,}3 \cdot 10^{-5}$ |
| 898 | 120 | $7{,}9 \cdot 10^{-5}$ |
| 899 | 93 | $13{,}4 \cdot 10^{-5}$ |

LOW LOSS FERRITES

BACKGROUND OF THE INVENTION

1. Field of the Invention

The invention relates to low loss ferrites and especially to ferrites used at high, very high and ultra-high temperatures (of 1.5 MHz to 500 MHz) and more particularly materials that show low magnetic losses under high applied power values. The particular features of these materials are firstly their low sintering temperature (T<1000° C.) and secondly their low magnetic losses at high, very high and ultra-high frequencies. The ferrites described in the present invention are particularly suitable for making low-loss magnetic cores for high power (100 to 1000 W) applications, very wide frequency band applications or integrated electronic applications in the radiocommunications frequency range.

2. Description of the Prior Art

The development of electronic equipment is linked to the miniaturization of the passive and active components. Among these components, the bulkiest are the passive components which fulfill the resistor, inductor and capacitor functions and, more particularly, the passive inductive or inductance components. In the "high-level" applications, which implement high electrical power values, the losses of the inductive component are determined essentially by the total losses of the magnetic material used to make the core. In the high frequency range (f>1.5 MHz), nickel-zinc ferrites are used because of their appropriate magnetic properties and high electrical resistivity.

The "low loss" ferrites designed for high frequency applications (f>1 MHz) are generally nickel-zinc ferrites with the chemical formula $Ni_xZn_yFe_2O_4$ with x+y=1. They are used as magnetic cores having a variety of forms (torus, pot, rod and other cores) enabling the making of inductors or wound transformers, the winding part being made by means of enamelled copper wire or coaxial conductors.

The performance characteristics of these components are often limited by the total losses of the ferrite which, therefore, determine the dimensions of the component and the permissible incident power.

FIG. 1 indicates the performance characteristics of a commercially available nickel-zinc ferrite optimized for applications of this type. It represents the variation of the total losses measured at 1.5 MHz as a function of the induction and at ambient temperature. The measurement is made on a wound torus using an enameled copper wire. The initial static permeability of the ferrite is equal to 125.

FIG. 2 shows the variation of the total losses of the same material as a function of the frequency and for a frequency/induction product equal to 37.5 MHz.mT, these conditions corresponding to the operation of the wideband power transformers. It must be noted that the losses diminish when the frequency is increased because the induction in the material diminishes. The total losses as a function of frequency and the induction may be estimated according to the relationship: p (f, B)=cste. $B^\alpha$. $f^\alpha$ where $\alpha \geq 2$ and $\beta \geq 1$. They increase monotonically when the frequency increases.

The known types of ferrites have high losses at high frequencies and at high power values.

The invention seeks to obtain ferrites that can be used to overcome this drawback.

SUMMARY OF THE INVENTION

The invention therefore relates to a ferrite material based on nickel, copper and zinc having the following formula:

$$Ni_xZn_yCu_zCo_\epsilon Fe_{2\pm\delta}O_4$$

in which:

$$x+y+z+\epsilon=1\pm\delta$$

$$\delta \leq 0.05$$

$$0.04 \leq \epsilon$$

$$0.05 \leq z \leq 0.35$$

$$0 \leq y \leq 0.65$$

The invention also relates to a component applying the ferrite material, the component comprising at least one ferrite core.

BRIEF DESCRIPTION OF THE DRAWINGS

The different objects and characteristics of the invention shall appear more clearly in the following description and the appended figures, given by way of an example.

MORE DETAILED DESCRIPTION

The ferrites that are the object of the present invention have the following chemical composition:

$$Ni_xZn_yCu_zCo_\epsilon Fe_{2\pm\delta}O_4$$

with:

$$x+y+z+\epsilon=1\pm\delta$$

$$\delta \leq 0.05$$

$\epsilon$ greater than 0.04 but preferably: $0.04 \leq \epsilon \leq 0.1$ $$0.05 \leq z \leq 0.35$$

$$0 \leq y \leq 0.65$$

These ferrites have the following dual advantage:

they can be prepared on an industrial scale with a major reduction in the firing and sintering temperatures;

their magnetic losses are low at low induction levels but, above all, at high induction levels.

The method for preparing the ferrites of the present invention is described in French Patent Application No. 9,604,316. The final properties of the ferrite are closely related to the chemical composition and especially to the cobalt content, the departure from stoichiometry in iron and the partial pressure of oxygen during the sintering.

A first exemplary embodiment of the cobalt-substituted nickel-zinc-copper ferrites having the chemical composition:

$$Ni_{0.39}Zn_{0.39}Cu_{0.20}Co_{0.021}Fe_{2\pm\delta}O_4$$

was made by using the following industrial process.

The raw materials used are industrial oxides of nickel (NiO), zinc (ZnO), iron ($Fe_2O_3$), copper (CuO) and cobalt ($CO_3O_4$) or derivatives (carbonates, hydroxides, etc.).

δ which represents the departure from stoicheiometry in iron varies from +0.015 to −0.045. The negative values correspond to iron deficiencies and the positive values to iron excesses.

Figure 1:
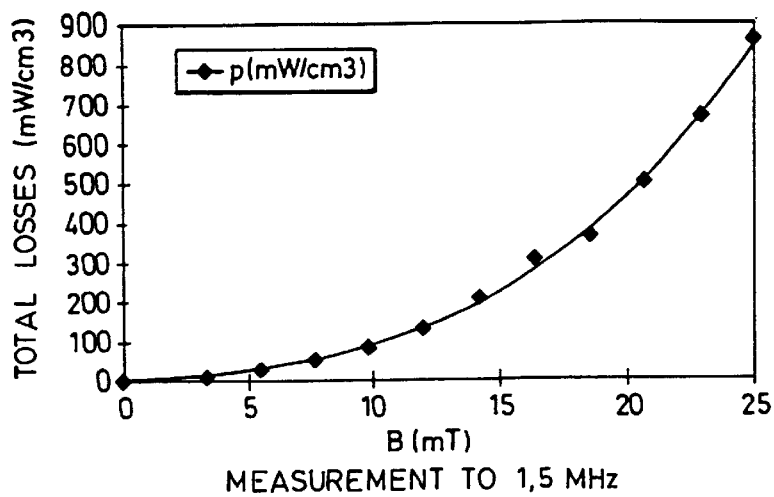
FIGS. 1 and 2 are curves of total losses measured as a function of the induction and the frequency.
Figure 2:
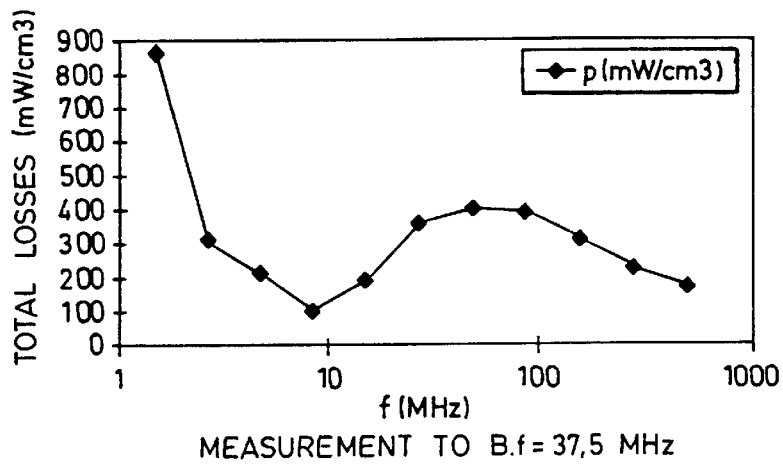
Figure 3:
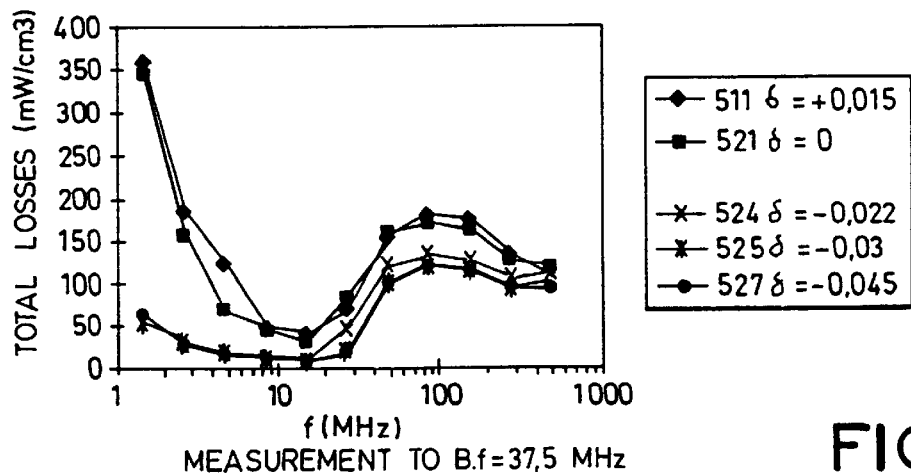
FIGS. 3 and 4 are curves and a table that are characteristic of an example of ferrites according to the invention.

The powders are fired at 800° C. and then sintered at 950° C. for 2 hours in air. Different samples with different values of δ have been made. The measurement of the total losses is done on toruses with dimensions $D_{ext}$=6.8 mm, $D_{int}$=3.15 mm, h=4 mm. FIG. 3 gives the variation of the total losses as a function of the frequency for each sample.

It can be seen that, for identical measurement conditions (ambient temperature and product B.f=25 mT.MHz), the total losses diminish when the iron deficiency increases. By contrast, the variations of losses measured at low power levels as indicated in the table of FIG. 4 which represents the static permeability and the dielectric loss factor at low power levels and at 1.5 MHz, measured with a Q-meter on a wound torus (dimensions $D_{ext}$=6.8 mm, $D_{int}$=3.15 mm, h=4 mm; number of turns=10), do not follow the same logic: the sample with the lowest losses at low levels (reference 523) has high losses at intermediate levels.

According to a secondary exemplary embodiment, the cobalt-substituted nickel-zinc copper ferrites with a chemical composition $Ni_xZn_yCu_{020}Co_\epsilon Fe_{1.96}O_4$ where 2x+ϵ=0.86 and 0≦y≦0.65 have been synthesized by means of an industrial process similar to the one described here above. The raw materials used are industrial oxides of nickel (NiO), zinc (ZnO), iron ($Fe_2O_3$), copper (CuO) and cobalt ($CO_3O_4$) or derivatives (carbonates, hydroxides, etc.).

For different values of cobalt ratio, the variation in total losses was measured as a function of the induction at ambient temperature for an operating frequency of 1.5 MHz. FIG. 4 shows that the greater the cobalt ratio, the lower the total losses. The relative differences are all the greater as the induction is high. However, the measurements made at low power levels show exactly the reverse (see table of FIG. 6). The sample with the smallest low-level losses also has the highest total losses (reference 896).

Figures 4, 5, 6:
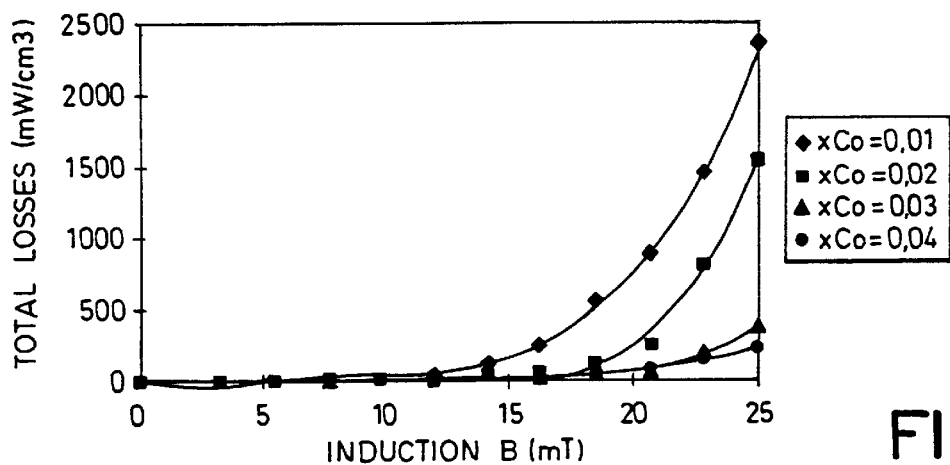
FIGS. 5 and 6 are characteristic curves of a variant of a ferrite according to the invention.

The table of FIG. 6 gives the static permeability ($\mu s$) and the dielectric loss factor (tan δ/μ) at low power level with B<1 mT for different samples with different cobalt values.

The measurements were made with a Q-meter on a wound torus ($D_{ext}$=6.8 mm, $D_{int}$=3.15 mm, h=4 mm; number of turns=10).

A ferrite material according to the invention can work at low losses in a frequency range of 0.5 to 500 MHz for high power induction values, especially up to 30 mT.

A material of this kind can be used in different types of components, especially magnetic components. For example, it may be used to manufacture cores of micro-inductors or as a magnetic component (transformers, inductors) in switched supplies or DC/DC converter supplies. It can also be used for to manufacture circulators or microwave phase-shifters.

A description shall now be given of a method of manufacturing a ferrite material according to the invention. This method comprises the following steps:

The Weighing of the Following Raw Materials

Nickel oxide (NiO), zinc oxide (ZnO), iron oxide ($Fe_2O_3$), copper oxide (CuO) and cobalt oxide ($CO_3O_4$).

During the weighing of the iron oxide, it is preferable to compensate for the addition of iron due to the wearing-out of the crushing elements when they are beads or steel bars.

The Crushing of the Raw Materials

This operation has the twofold purpose of mixing the different constituent elements and reducing their grain size, thus making them more reactive.

The Firing of the Powder

This thermal operation is designed to partially form the desired crystal phase. This operation may typically be done between 750° C. and 850° C. depending on the desired nature of the ferrite material of the invention under air for about 2 hours.

The Re-crushing of the Product of Firing

This operation is made necessary by the expansion of the powder grains induced by the firing. It is done under conditions similar to those of the first crushing.

The Pressing of the Powder

The pressing is done preferably by means of steel molds and axial mechanical presses that can deliver pressures in the range of 0.5 to 2 t/cm². It is also possible to carry out isostatic pressing.

Sintering

This heat treatment is designed for the complete formation of the desired crystalline phase as well as for the densification of the polycrystalline ceramic. For the ferrite materials of the present invention, this treatment can be done at temperatures in the region of 900° C. to 1000° C. with steady-state conditions for 2 to 15 hours.

This sintering can be done in air in conventional furnaces. To have lower losses for the same initial composition, this sintering can be done in sealed furnaces under oxygen or in an atmosphere with an oxygen content greater than the ambient atmosphere ($Po_2$>20% for example). It can also be done in conventional furnaces with a flow of oxygen.

The ferrite according to the invention can be used to optimize the properties at low powers and very high frequencies (>100 MHz).

The method of the invention for the making of a material

in which $x+y+z+z+\epsilon=1\pm\delta$ $0\leq y\leq 0.65$ $\delta\leq 0.05$ $0.04<\epsilon$ $0.05\leq z\leq 0.35$ thus comprises the following steps:

the weighing of the following materials to obtain the composition of the ferrite material: nickel oxide, zinc oxide, iron oxide, copper oxide, cobalt oxide;

the crushing of the oxide materials;

firing at a temperature ranging from 750° C. to 850° C.;

re-crushing of the powder obtained;

pressing of the powder and sintering at a temperature of 900° to 1000° C., wherein the sintering takes place under an oxygen partial pressure greater than 20%. Such sintering can also be done in an enclosure with a circulation of oxygen.

What is claimed is:

1. A ferrite material based on nickel, copper and zinc having the following formula:

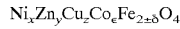

in which $x+y+z+\epsilon=1+\delta$ $0\leq y\leq 0.65$ $\delta \leq 0.05$ $0.04 < \epsilon$ $0.05 \leq z \leq 0.35$.

2. A material according to claim 1, wherein:

$0.04 \leq \epsilon < 0.0$.

3. A ferrite core comprising the ferrite material according to claim 1.

4. A component according to claim 3, wherein the component is an inductor.

5. A component according to claim 3, wherein the component is a transformer.

6. A circulator or microwave phase-shifter comprising a ferrite material according to claim 1.

7. A method for the making of a material $$Ni_xZn_yCu_zCo_\epsilon Fe_{2\pm\delta}O_4$$

in which $x+y+z+\epsilon=1\pm\delta$ $0 \leq y \leq 0.65$ $\delta \leq 0.05$ $0.04 < \epsilon$ $0.05 \leq z \leq 0.35$ comprising the following steps:

the weighing of the following materials to obtain the composition of the ferrite material: nickel oxide, zinc oxide, iron oxide, copper oxide, cobalt oxide;

the crushing of the oxide materials;

firing at a temperature ranging from 750° C. to 850° C.;

re-crushing of the powder obtained;

pressing of the powder and sintering at a temperature of 900° to 1000° C., wherein the sintering takes place under an oxygen partial pressure greater than 20%.

8. A method according to claim 7, wherein the sintering is done in a sealed enclosure with an oxygen content higher than that of the ambient atmosphere.

9. A method according to claim 7, wherein the sintering is done in an enclosure with a circulation of oxygen.

\* \* \* \* \*

UNITED STATES PATENT AND TRADEMARK OFFICE
CERTIFICATE OF CORRECTION

PATENT NO.     : 6,436,307 B1
DATED          : August 20, 2002
INVENTOR(S)    : Lebourgeois et al.

It is certified that error appears in the above-identified patent and that said Letters Patent is hereby corrected as shown below:

Column 5,
Line 7, "$0.04 \leqq \epsilon < 0.0$" should read -- $0.04 < \epsilon \leq 0.0$ --.

Signed and Sealed this

Sixth Day of April, 2004

JON W. DUDAS
*Acting Director of the United States Patent and Trademark Office*

UNITED STATES PATENT AND TRADEMARK OFFICE
CERTIFICATE OF CORRECTION

PATENT NO.   : 6,436,307 B1
DATED        : August 20, 2002
INVENTOR(S)  : Lebourgeois et al.

It is certified that error appears in the above-identified patent and that said Letters Patent is hereby corrected as shown below:

<u>Column 5,</u>
Line 7, "$0.04 \leqq \epsilon < 0.0$" should read -- $0.04 < \epsilon \leq 0.1$ --.

This certificate supersedes Certificate of Correction issued April 6, 2004.

Signed and Sealed this

Twenty-ninth Day of June, 2004

JON W. DUDAS
*Acting Director of the United States Patent and Trademark Office*